Reissued June 21, 1949

Re. 23,128

UNITED STATES PATENT OFFICE 23,128

PRODUCTION OF VINYL CHLORIDE

Joseph F. Weiler, Lewiston, N. Y., assignor to Mathieson Chemical Corporation, a corporation of Virginia No Drawing. Original No. 2,412,308, dated December 10, 1946, Serial No. 538,088, May 30, 1944. Application for reissue April 9, 1949, Serial No. 86,605

1 Claim. (Cl. 260—656)

This invention relates to improvements in the production of vinyl chloride from ethylene dichloride and acetylene.

In accordance with the present invention, ethylene dichloride is subjected to pyrolytic decomposition to vinyl chloride and hydrogen chloride, the products of pyrolysis are then passed over an activated adsorbent, and, to the remaining unadsorbed decomposition products, is added acetylene, and, in some instances, hydrogen chloride, and the hydrogen chloride and acetylene are catalytically combined to form vinyl chloride.

The catalytic combination of hydrogen chloride and acetylene to form vinyl chloride is known. Catalysts which may be used include mercuric chloride and mixtures of mercuric chloride and alkali or alkaline earth chlorides, which may be deposited on the carrier such as silica gel or activated carbon. Ordinarily temperatures of 180 to 250° C. are used. The reaction is strongly exothermic, and control of the temperature difficult to obtain.

The process of the present invention affords a substantial improvement over previously suggested processes for the production of vinyl chloride in that when to the decomposition products of ethylene dichloride, surviving contact with the activated adsorbent, is added the necessary amount of acetylene to combine with the hydrogen chloride, there is formed a mixture of vinyl chloride, acetylene and hydrogen chloride. When such a gas mixture is passed over an appropriate catalyst for the addition of the hydrogen chloride to the acetylene, under the usual temperature and pressure conditions, the vinyl chloride serves as a diluent which prevents any undue rise in the temperature of the catalyst, and overcomes a number of the difficulties heretofore encountered in controlling the temperature of the catalyst.

It has heretofore been proposed to prevent undue rise in temperature of the catalyst in the catalytic combination of acetylene and hydrogen chloride by the use of such inert diluents as hydrogen, carbon monoxide, and the like, but the use of such diluents introduces a number of operating difficulties which are not encountered when vinyl chloride is present to prevent the catalyst from overheating. Thus the vinyl chloride is recovered from the reaction product by cooling and condensing. When vinyl chloride is used as the diluent, its partial pressure is such that a good recovery is possible. Fixed gases, such as hydrogen, carbon monoxide and the like interfere with the recovery of the vinyl chloride, because of the low partial pressure of vinyl chloride in the reaction product, to an extent which makes economical recovery difficult or impossible. Furthermore, vinyl chloride has a considerably higher heat capacity than the gases heretofore suggested as diluents in the temperature range used in the catalytic combination, namely, by 180 to 250° C., and therefore is a more efficient tempering medium. It produces no undesirable byproducts as may be produced with hydrogen, hydrogen sulfide, carbon monoxide and other previously suggested gases, including excess acetylene, which tends to polymerize.

The pyrolysis of the ethylene dichloride, the first step in the process, ordinarily results in the formation of some acetylene, as well as vinyl chloride and hydrogen chloride, but any acetylene formed in the pyrolysis is converted to vinyl chloride along with that supplied from an outside source, so that the production of acetylene in the pyrolysis of the ethylene dichloride does not substantially interfere with the efficiency of the process.

The pyrolysis of the ethylene dichloride is carried out in the usual way, advantageously without the use of a catalyst, by passing the ethylene dichloride through pyrolysis equipment at a temperature of 575–600° C. The mixture of products of pyrolysis is then passed through a bed of activated carbon or similar adsorption agent before bringing it into contact with the catalyst, as by such procedure, the life of the catalyst is lengthened, presumably through the removal of some material, the nature of which at present is not known, which poisons or inactivates the catalyst.

The acetylene which is used in the reaction may be obtained from any convenient source, and may be a relatively pure product or may contain considerable proportions of diluent, such as other hydrocarbons, which are non-reactive in the process. Acetylene-containing mixtures from the cracking of hydrocarbons, which are readily produced with acetylene contents of around 70 to 80%, may be used, as may gas mixtures containing even less acetylene. However, the less the content of materials other than vinyl chloride, hydrogen chloride, and acetylene in the reaction mixture, the greater are the advantages of the present invention in promoting the production of vinyl chloride and overcoming the difficulties incident to the generation of heat by the exothermic reaction, and the less the difficulties encountered in, and the cost of, recovering the vinyl chloride in a pure state.

In practicing the present invention, ethylene dichloride is passed through suitable pyrolysis equipment, where it is heated to around 575–600° C. with conversion of most of the ethylene dichloride to vinyl chloride and hydrogen chloride, with some formation of acetylene. The resulting gas mixture is then passed through a bed of activated carbon or similar adsorption agent. Acetylene is added to the resulting gas mixture, which is then passed through a catalyst bed composed of a suitable catalyst and maintained at a temperature of 180–270° C. Hydrogen chloride and acetylene should be present in the gaseous reaction mixture in approximately stoichiometric proportions. Thus, acetylene may be added to the adsorbent treated products of pyrolysis in the proportions required to react with the hydrogen chloride there present in excess of the proportion of acetylene there present, or both hydrogen chloride and acetylene may be added to the adsorbent treated products of pyrolysis, with the total acetylene and hydrogen chloride in the final mixture adjusted to approximate molar equality. The amount of vinyl chloride in the gas mixture will ordinarily be about one-third of the total feed (gas volume basis), which is the proportion obtained if only acetylene be added to the products of pyrolysis; but by the addition of extraneous vinyl chloride, or hydrogen chloride and acetylene, other proportions of vinyl chloride may be present in the gas mixture, and the amount of vinyl chloride will usually be between 15% and 50% (gas volume basis) and may be as high as about 75%.

The vinyl chloride in the exit gases is recovered by cooling and condensing the gases, and fractionally distilling the condensate. Yields of vinyl chloride ranging up to 90%, based on the ethylene dichloride used, are readily obtained, while yields ranging up to 99% based on the acetylene are obtained. The catalyst is easily kept at reaction temperature, without any special means for cooling, and remains active for long periods, in contrast with the behavior of such catalysts in operations in which the catalyst temperature rises, frequently to 400° C., in which the catalyst rapidly deteriorates.

The invention will be illustrated by the following examples, but it is not limited thereto.

*Example 1.*—Ethylene dichloride (1,2-dichloroethane) was vaporized at the rate of 0.5 mole/hr. through a Pyrex glass pyrolysis tube of 225 ml. volume maintained at 575°–600° C. The exit gases (pyrolysis products) were then conducted through a water-cooled condenser into a mixing chamber where acetylene was introduced at the rate of 0.5 mole/hr. The absence of condensate in the condenser indicated substantially complete conversion of the ethylene dichloride. The mixture was then passed over a catalyst consisting of a mixture of mercuric chloride and potassium chloride deposited on activated charcoal. A glass catalyst tube provided a catalyst bed 5.5 cm.$^2$ in cross-section and 40 cm. in length. Two separate resistance wire windings on the catalyst tube provided means for externally heating the initial and final 20 cms. of the catalyst bed independently of each other. A thermocouple tube running through the longitudinal axis of the catalyst bed permitted exploration of the temperature at various points in the bed. Before passage of the mixture of acetylene and pyrolysis products through the catalyst bed, the initial 20 cm. of said catalyst bed was raised to 240°–250° C. and the final 20 cm. to 180–190° C. by means of the resistance wire heaters. As soon as the passage of the mixture of acetylene and pyrolysis products through the catalyst bed was started, the external heating of the initial 20 cm. of catalyst bed was discontinued. Heat of reaction was almost immediately discernible by an increase in temperature of the first 4–5 cm. of the catalyst bed. The temperature at this point in the catalyst bed rose to a maximum of 270° in a few minutes while deeper in the catalyst bed the temperature fell progressively. With continued passage of the gas the 4–5 cm. "hot spot" progressed deeper into the catalyst bed (maintaining a maximum temperature of 270° at the "hot spot") while the forward end of the catalyst bed began to cool indicating a loss in activity of the catalyst at this point. The "hot spot" had transversed the initial 20 cms. of the catalyst bed after 5 hrs. of operation at which time the process was stopped.

The final product was caught in a trap cooled with a solid $CO_2$-acetone mixture and then fractionally distilled. There was recovered 4.5 moles of pure vinyl chloride which is 90 per cent of the theoretical yield.

*Example 2.*—Pyrolysis of ethylene dichloride was carried out as described in Example 1. The pyrolysis products after leaving the water-cooled condenser were passed through a trap containing 455 ml. of activated charcoal at room temperature before being mixed with the acetylene. The mixture of acetylene and pyrolysis products thus obtained were passed over the same catalyst preparation under the same conditions as described in Example 1. The "hot spot" temperature was 270° C. The "hot spot" at the end of 4½ hours of operation had progressed only an inch into the catalyst bed, thus demonstrating the beneficial action of the activated charcoal treatment of the pyrolysis products in prolonging the life of the catalyst. By fractional distillation there was received 3.8 mols of pure vinyl chloride or 84.4 percent of the theoretical yield.

*Example 3.*—Ethylene dichloride was pyrolyzed, and the products mixed with acetylene as in Example 1. The mixture was passed over a small surface of mercury heated to 300° C. and thence through a catalyst bed consisting of activated charcoal which was heated externally sufficiently to maintain a temperature of 250° C. when no gas was passing through it. Passage of the reaction mixture through the catalyst bed without reducing the supply of external heat resulted in an increase in temperature to 265° C. throughout the catalyst bed with no pronounced "hot spot." The reaction mixture after passing through the activated charcoal was passed through an additional reactor containing a catalyst consisting of mercuric chloride and potassium chloride deposited on activated charcoal and maintained at 180° C. Only a slight increase in temperature occurred in this catalyst bed. Pure vinyl chloride to the extent of 87.7% of the theoretical yield was obtained.

*Example 4.*—Ethylene dichloride was pyrolyzed over an activated alumina catalyst at 450° C. at the rate of 0.5 mole/hr. The resulting pyrolysis products were passed through a trap containing activated charcoal at room temperature, then mixed with acetylene (0.5 mole/hr.) and the mixture treated exactly as in Example 2. The maximum temperature of the "hot spot" was 270° C. and the "hot spot" had not progressed discernibly into the catalyst bed after 6 hours of operation. Pure vinyl chloride to the extent of 68.5% of the theoretical yield was recovered. The low yield is attributable to the use of a catalyst in the ethylene dichloride pyrolysis.

I claim:

In a process for producing vinyl chloride the combination of steps which comprises subjecting ethylene dichloride to pyrolysis to form vinyl chloride and hydrogen chloride, passing the products of pyrolysis over an activated adsorbent, adding acetylene to the adsorbent treated products of pyrolysis, and catalytically reacting the acetylene with the hydrogen chloride in the mixture.

JOSEPH F. WEILER.

No references cited.